(12) United States Patent
Hall

(10) Patent No.: US 6,296,330 B1
(45) Date of Patent: Oct. 2, 2001

(54) CRAWLER WEB FOR CRAWLER CHAINS OF CRAWLER VEHICLES, IN PARTICULAR FOR SKI SLOPE OR CROSS-COUNTRY TRACKERS

(75) Inventor: Hans Hall, Weingarten (DE)

(73) Assignee: Werner Hall, Weingarten (DE)

( * ) Notice: Subject to any disclaimer, the term of this patent is extended or adjusted under 35 U.S.C. 154(b) by 0 days.

(21) Appl. No.: 09/210,625

(22) Filed: Dec. 14, 1998

(30) Foreign Application Priority Data

Dec. 13, 1997 (DE) ............................................... 197 55 581

(51) Int. Cl.$^7$ .............................. B62D 55/28; B65G 15/44
(52) U.S. Cl. ............................................. 305/180; 305/161
(58) Field of Search .................................. 305/180 I, 181, 305/160, 161, 187, 191; 301/43

(56) References Cited

U.S. PATENT DOCUMENTS

| | | | |
|---|---|---|---|
| 3,165,364 | * 1/1965 | Hardman et al. | 305/187 |
| 3,369,624 | * 2/1968 | Lauffmann | 305/181 |
| 3,829,174 | * 8/1974 | Thomas | 305/180 |
| 3,883,190 | 5/1975 | Kilbane, Jr. | |
| 4,560,211 | * 12/1985 | van der Lely | 305/180 |
| 5,265,949 | * 11/1993 | Haug | 305/180 |
| 5,284,386 | * 2/1994 | Rubel | 305/180 |
| 5,354,124 | * 10/1994 | James | 305/180 |
| 5,951,125 | * 9/1999 | Jager et al. | 305/180 |

FOREIGN PATENT DOCUMENTS

| | | |
|---|---|---|
| 644 558 | 8/1984 | (CH) . |
| G 93 03 466 | 8/1994 | (DE) . |
| 296 02 940 | 7/1997 | (DE) . |
| 0 381 642 | 8/1990 | (EP) . |
| 0 414 208 | 2/1991 | (EP) . |

* cited by examiner

*Primary Examiner*—S. Joseph Morano
*Assistant Examiner*—Jason R. Bellinger
(74) *Attorney, Agent, or Firm*—Venable; Robert Kinberg

(57) ABSTRACT

A crawler web for crawler belts of crawler vehicles, in particular for ski slope vehicles or cross-country trackers, is proposed, which is fastened, transversely to the running direction, to mutually parallel bands oriented in the direction of travel. The bands being an elongate basic body which has a sheet-like support connected in the direction of the bands. The object of the invention is to provide a crawler web which can be adapted individually for different applications and can be produced at comparatively low costs. The object is achieved in that the basic body encompasses, in cross section, two side legs with a connecting web arranged between them, at least one side leg approaching the other in such a way that a cutting edge can be inserted between the legs.

15 Claims, 7 Drawing Sheets

CRAWLER WEB FOR CRAWLER CHAINS OF CRAWLER VEHICLES, IN PARTICULAR FOR SKI SLOPE OR CROSS-COUNTRY TRACKERS

BACKGROUND OF THE INVENTION

The invention relates to a crawler web for crawler belts of crawler vehicles.

Various embodiments of crawler webs are known. Crawler webs consisting completely of steel or aluminum have been disclosed, as have those which have a basic body made of aluminum to which a wear-resistant cutting edge is fastened by screwing or, for example, fastened during the extrusion of an aluminum profile (see, in this respect, Swiss Patent Specification CH 644,558 and European Patent Specification EP 0,381,642 B1).

The disadvantage of a steel web is that it is too heavy. On the other hand, an aluminum web, when used under rough operating conditions, is subject to pronounced wear and this may cause the web to rupture. Aluminum webs having incorporated or screwed-in steel inserts are, in known embodiments, costly in terms of production and the exchange of worn structural units.

European Patent Specification EP 0,414,208 B1 describes a steel crawler web in which manufacturing problems otherwise customary in the case of steel webs are avoided. In this embodiment, high wear resistance and a simple design are gained at the expense of a higher weight, as compared with aluminum webs. For this purpose, the steel web has, in cross section, a U-bow with two U-legs and, between them, a connecting web, the first U-leg having, as an extension, a connecting leg, guided inward via a bend, and, after a further bend, an adjoining blade approximately parallel to the U-legs. The embodiment is distinguished in that the second U-leg is also bent inward and is welded to the first connecting leg, so as to form, in cross section, a house-like cavity beyond which the first U-leg projects. In addition to the high weight of this embodiment, another disadvantage is that, when the cutting edge or blade of the web becomes worn, the entire web may have to be replaced, thus resulting in high operating costs. Moreover, the web is designed for a hard underlying surface and is overdimensioned for less demanding applications.

SUMMARY OF THE INVENTION

The object on which the invention is, whilst avoiding the disadvantages of the prior art, to propose a crawler web which can be adapted individually for different applications and can be produced at comparatively low cost.

The invention pertains to a crawler web for crawler belts of crawler vehicles, in particular for ski slope vehicles or cross-country trackers, which is fastened transversely to the running direction, to mutually parallel bands oriented in the direction of travel and which comprises an elongate basic body which has a sheet-like support in the direction of the bands. The basic idea of the invention, then, is that the basic body consists, in cross section, of two side legs with a connecting web arranged between them. In this case, at least one side leg approaches the other in such a way that a cutting edge can be inserted between the side legs. By virtue of the design according to the invention, it is possible for the basic body and the cutting edge or the blade to be inserted, to be produced from different materials. For example, the basic body, in the form of a one-piece profile, may consist of a light metal, such as, for example, aluminum, or even of plastic-fiber-reinforced synthetic resin. By contrast, the cutting edge is preferably manufactured from a wear-resistant material, such as, as example, tempering steel. By virtue of the type of cutting edge reception, different cutting-edge thicknesses can easily be used so that the crawler web can be adapted individually to the application. That is to say, the cutting-edge width and the cutting-edge material can be coordinated with the terrain and the aggressiveness with which the crawler web is to penetrate into the terrain. In contrast to embodiments in which the cutting edge is inserted into a groove of a crawler web basic body, that is to say the use of different materials and, to a limited extent, different cutting-edge thicknesses are also possible, the reception method according to the invention always ensures that the inserted fastened cutting edge is seated snugly, without any play, between the side legs. This is because, when the cutting edge is fastened, the side legs can, if appropriate, be moved nearer to or further away from one another and be adapted to different cutting-edge thicknesses, this not being possible in the case of the lateral walls of a groove.

In a particularly advantageous embodiment at least one side leg merges into a portion in which it runs essentially parallel to the other leg, at a distance therefrom, in such a way that a cutting edge can be inserted between the legs. That is to say, that at least one leg approaches the other leg as far as the distance at which they then run essentially parallel, without touching one another in the process. In the case of cross sections defined by segments of a straight line, a transition into the parallel portion always takes place by means of a bend. In the case of continuous cross-sectional shapes, however, this does not have to be so. By virtue of these measures, a screw connection, rivet connection or titanium oxide connection can be made particularly easily in the region of the parallel portions.

In a further preferred embodiment of the invention, the connecting web serves at the same time as a sheet-like support for the crawler web on the bands of the crawler belt. It is advantageous if that portion of each of the side legs which runs parallel to and at a distance from the other, is oriented essentially perpendicularly to the connecting web. A simple and expedient embodiment of the basic body of the crawler web can be achieved in this way.

So that no distinction has to be made between left and right crawler webs of a crawler belt, it is proposed, furthermore, to design the cross section of the basic body symmetrically. In this case, the two side legs approach one another in the same way and merge, after possibly one bend, into an essentially vertical portion and, there, run parallel to, and at a distance from, one another, in such a way that a cutting edge can be inserted. For example, side legs running in a straight line can be inclined inward and, after a bend, merge into the vertical portion. It is also preferred if the side legs first run vertically upward from the connecting web, that is to say form a kind of "U-shape", incline inward after a bend and again merge, after a further bend, into a portion which is perpendicular to the connecting web and in which the legs run parallel to, and at a distance from one another so that a cutting edge can be inserted between them.

Preferred methods of fastening the cutting edge in the region of the parallel portions are riveting, welding, Tox clinching, screwing and/or adhesive bonding.

In a particularly advantageous embodiment, the cutting edge runs continuously from the parallel portions as far as the connecting web. It is preferred, in this case, if the cutting edge is additionally retained in the region of the connecting web. This measure achieves a comparatively high loadbearing capacity for the cutting edge and high stability of the crawler web as a whole. Furthermore, shearing forces at the connection point at the cutting edge and side leg are greatly reduced or even avoided completely.

Moreover, it is advantageous if retention takes place by means of a longitudinal groove in the connecting web, the cutting edge being at least partially guided in said longitudinal groove. This constitutes a particularly simple way of implementing the invention. In a likewise favorable embodiment, retention takes place by means of a screw connection which is arranged in the region of the connecting web in a widened portion of the cutting edge.

The screw connection may also be combined with retention by means of a groove.

In order to achieve high strength values for the crawler web, along with a reduced wall thickness of the basic body, it is proposed, furthermore, that the hollow-profile-like basic body be filled with aluminum foam.

In order to achieve simple mounting of the crawler web on the bands, it is proposed that holding means for fastening the crawler web be provided in the region of the connecting web. In this case, the holding means may either comprise threaded bores directly in the connecting web or contain a threaded strip inserted into the basic body or, at the same time, constitute the holding means of the connecting web, corresponding orifices for the introduction of screws beings provided in the connecting web in the two last mentioned cases.

DETAILED DESCRIPTION OF THE PREFERRED EMBODIMENTS

Figure 1:
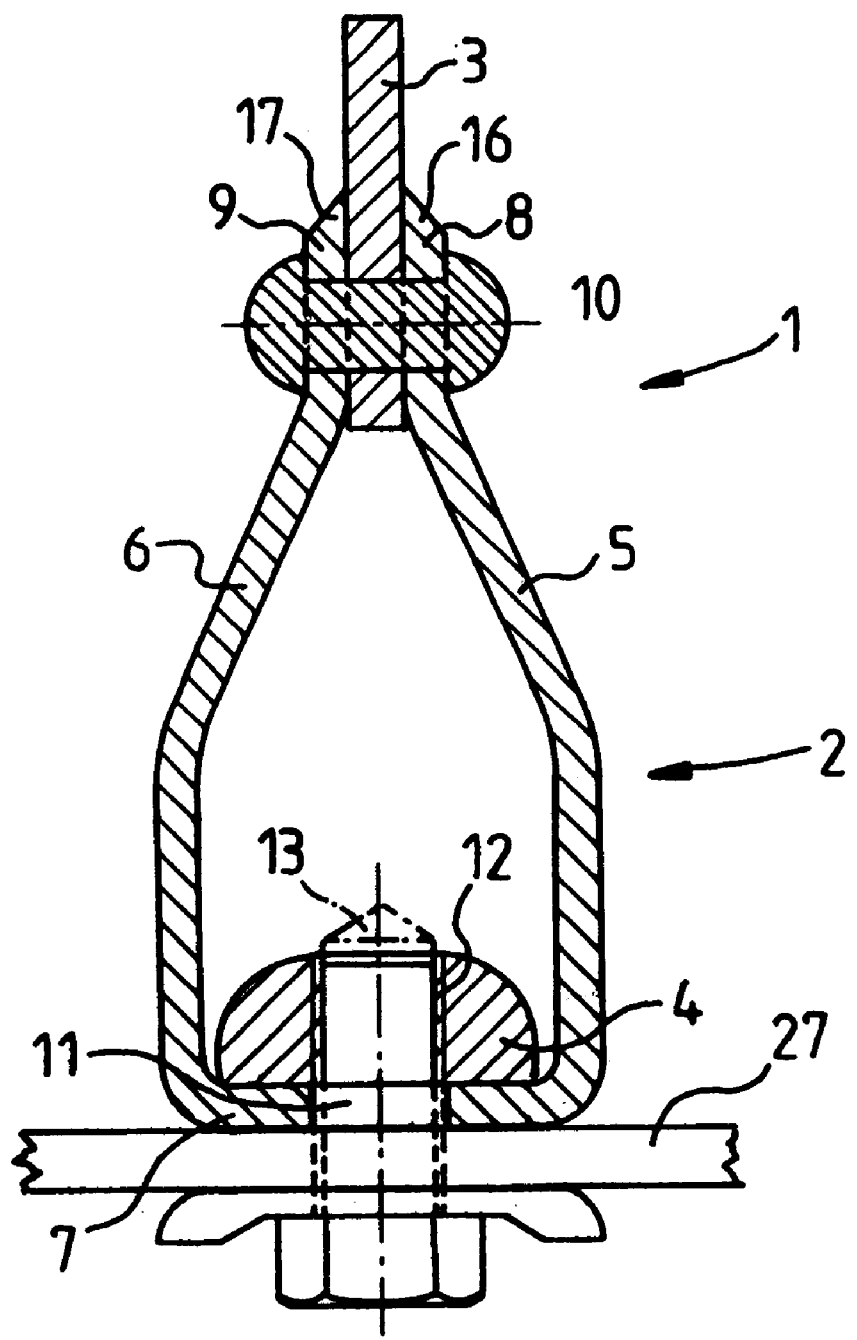
FIG. 1 shows a first exemplary embodiment of a crawler web according to the invention in cross section, with a riveted-in cutting edge.

The inventive crawler web 1 shown in FIG. 1 comprises an elongate basic body 2, a cutting edge 3 and a screw strip 4. The basic body 2 consists essentially of two side legs 5, 6 with a connecting web 7 arranged between them. The side legs 5, 6 are initially oriented perpendicularly to the connecting web 7 and form a U-bow in cross section in this region. Further along, the side legs are guided inward via a bend and merge, via a further bend, into a portion 8, 9 which, in the present exemplary embodiment, is oriented essentially perpendicularly to the connecting web 7 and in which the side legs run parallel to, and at a distance from, one another, in such a way that the cutting edge 3 can be inserted between the legs. As in the present exemplary embodiment, a rivet connection may be provided for the secure fastening of the cutting edge 3. For this purpose, the side legs 5, 7 have suitable bores in the parallel portion 8, 9 and the cutting edge 3.

The screw strip 4 serves for fastening the entire crawler web to the bands 27 of a crawler belt. For this purpose, recesses or bores 11 are made in the connecting web 7, so that corresponding screw threads 13 can be introduced in to the threaded bores 12 of the screw strip.

For the further exemplary embodiments, identical components are given the same reference numerals as in FIG. 1.

Figure 2:
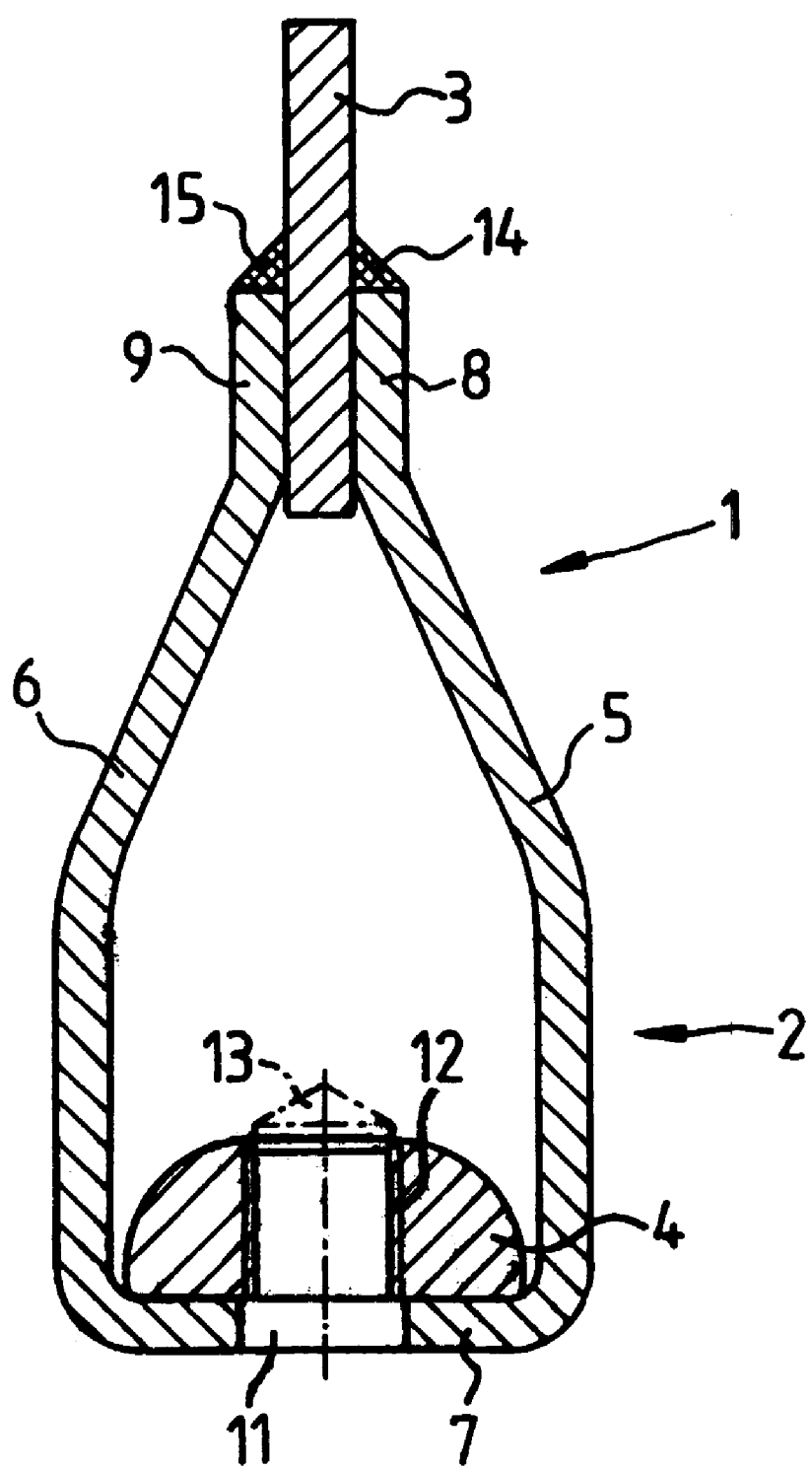
FIG. 2 shows a second exemplary embodiment of a crawler web in cross section, with a welded-on cutting edge.

The embodiment of FIG. 2 differs from that of FIG. 1 in that the cutting edge 3 is fastened to the basic body 2 not by means of a rivet connection 10, but by means of two weld seams 14, 15. The weld seams are arranged at the upper end of the portions 8, 9, which run parallel to, and at a distance from, one another. For this purpose, the portions 8, 9 do not terminate in a slope 16, 17, as in FIG. 1, in order thereby to provide a uniform transition to the cutting edge 3, but instead form, on the cutting edge 3, a shoulder suitable for receiving the weld seams 14, 15, which fill the shoulder and thereby provide the desired uniform transition to the cutting edge 3.

Figure 3:
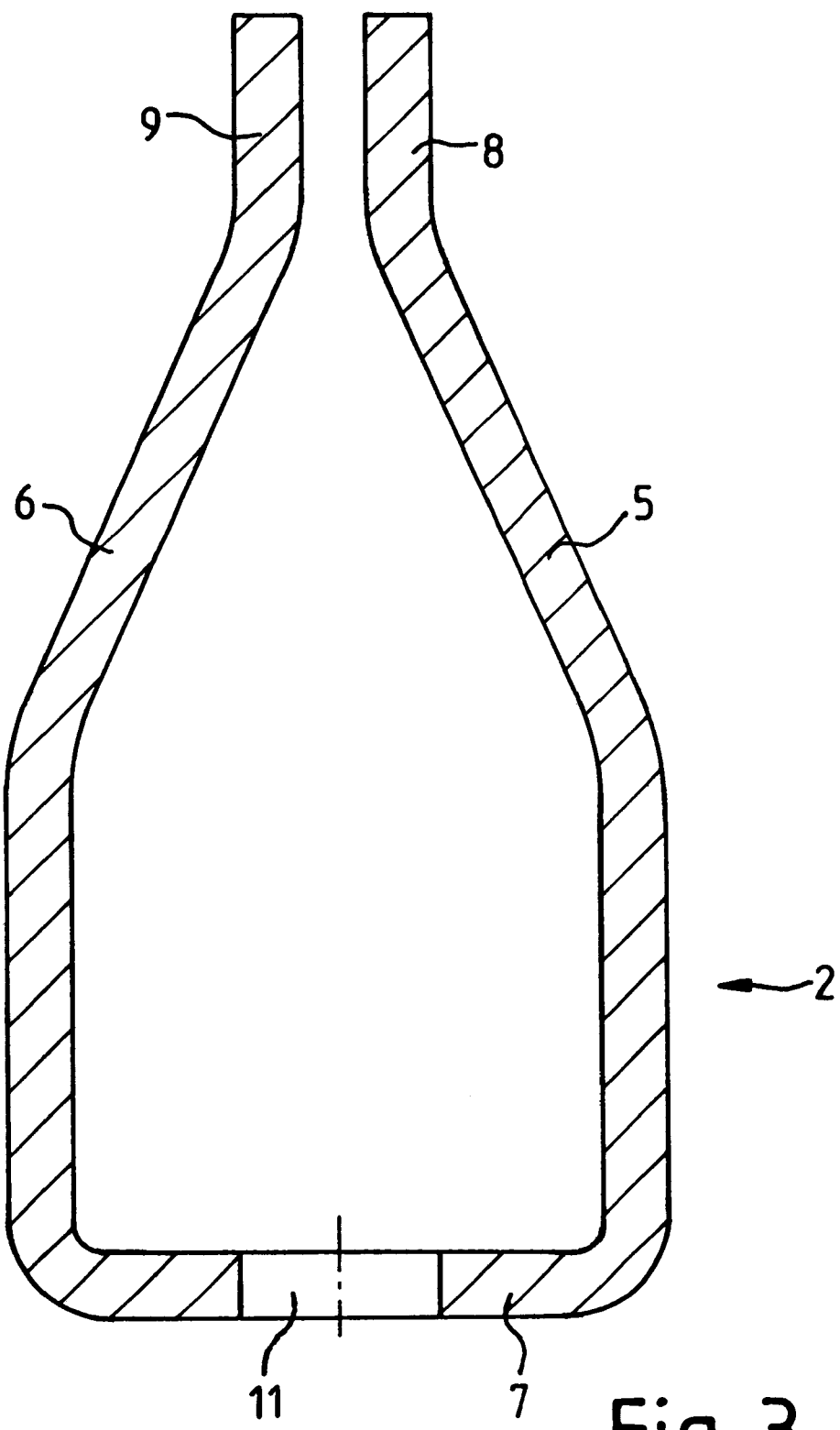
FIG. 3 shows a crawler web basic body in cross section for a welded crawler web according to FIG. 2.

FIG. 3 illustrates separately the basic body according to FIG. 2, on which the cutting edge 3 is welded.

Figure 4:
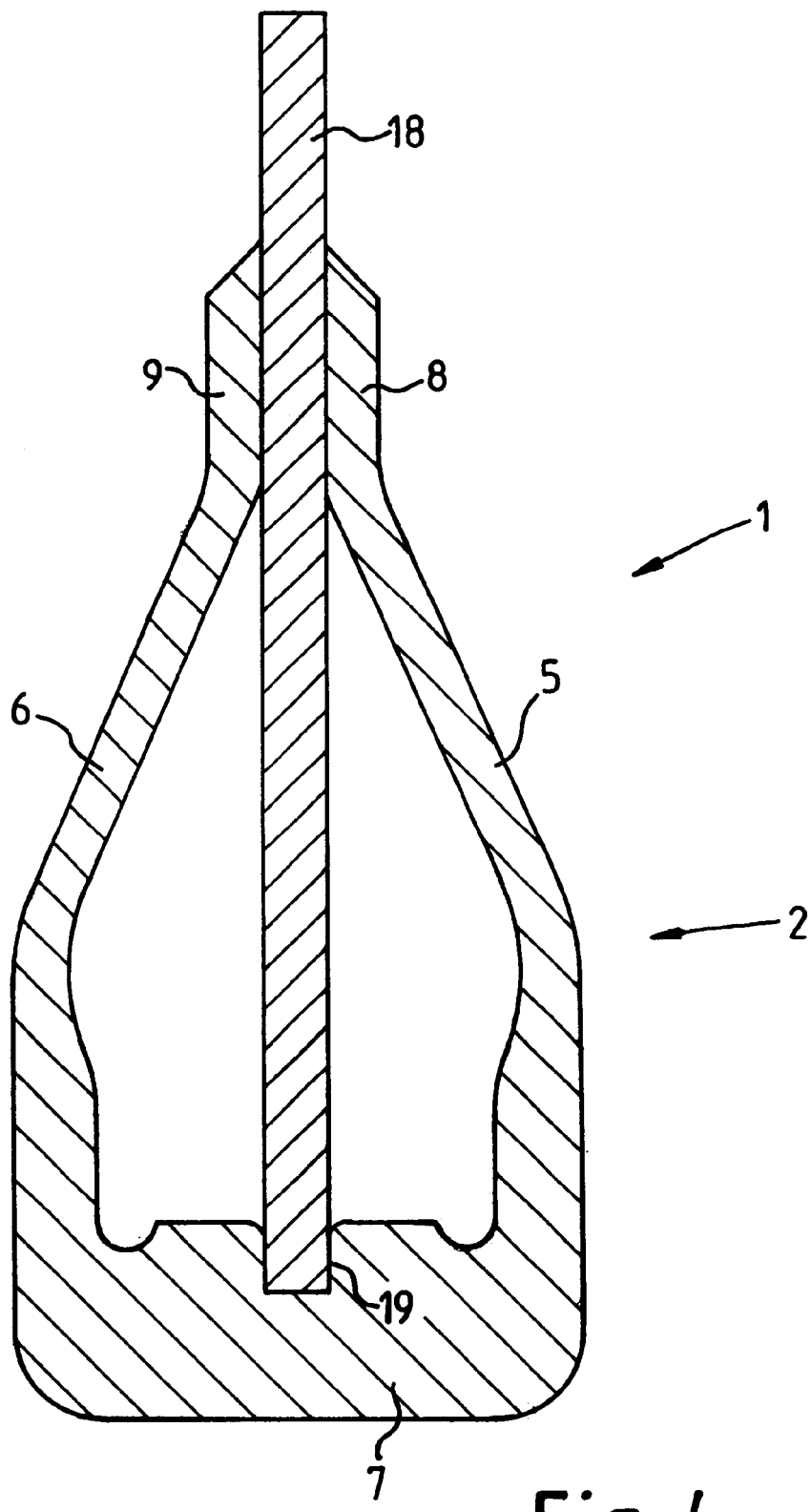
FIG. 4 shows a third exemplary embodiment of a crawler web according to the invention in cross section, with the cutting edge running continuously.
Figure 5:
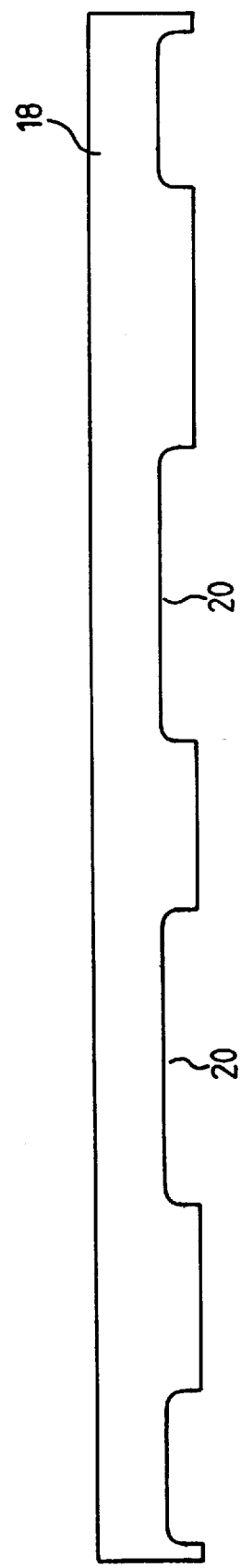
FIG. 5 shows a front view of the cutting edge belonging to the exemplary embodiment according to FIG. 4.

FIG. 4 shows an embodiment, in which a cutting edge 18 runs continuously in the basic body 2 as far as the connecting web 7. The cutting edge 18 is welded, for example, to the end of the parallel portions 8, 9 and the side legs 5, 6. In order to form the retention of the cutting edge 18 in the region of the connecting web 7, the latter is designed with a greater material thickness and has a groove 19, in which the cutting edge 18 is guided and which prevents the latter from escaping laterally or downward. In addition to improving the rigidity of the crawler web as a whole, an arrangement of this type, above all, absorbs shearing forces in the direction of the cutting edge 18 at the connection point of the cutting edge and basic body in the region of the parallel portions 8, 9. The fatigue strength of the basic body/cutting edge connection and therefore the reliability of the crawler web is consequently increased. As is evident in FIG. 5, it is sufficient if the cutting edge 18 is only partially guided in the groove 19 and is otherwise set back in accordance with the cutouts 20. In this way, material is saved and the total weight of the crawler web is therefore reduced.

Figure 6:
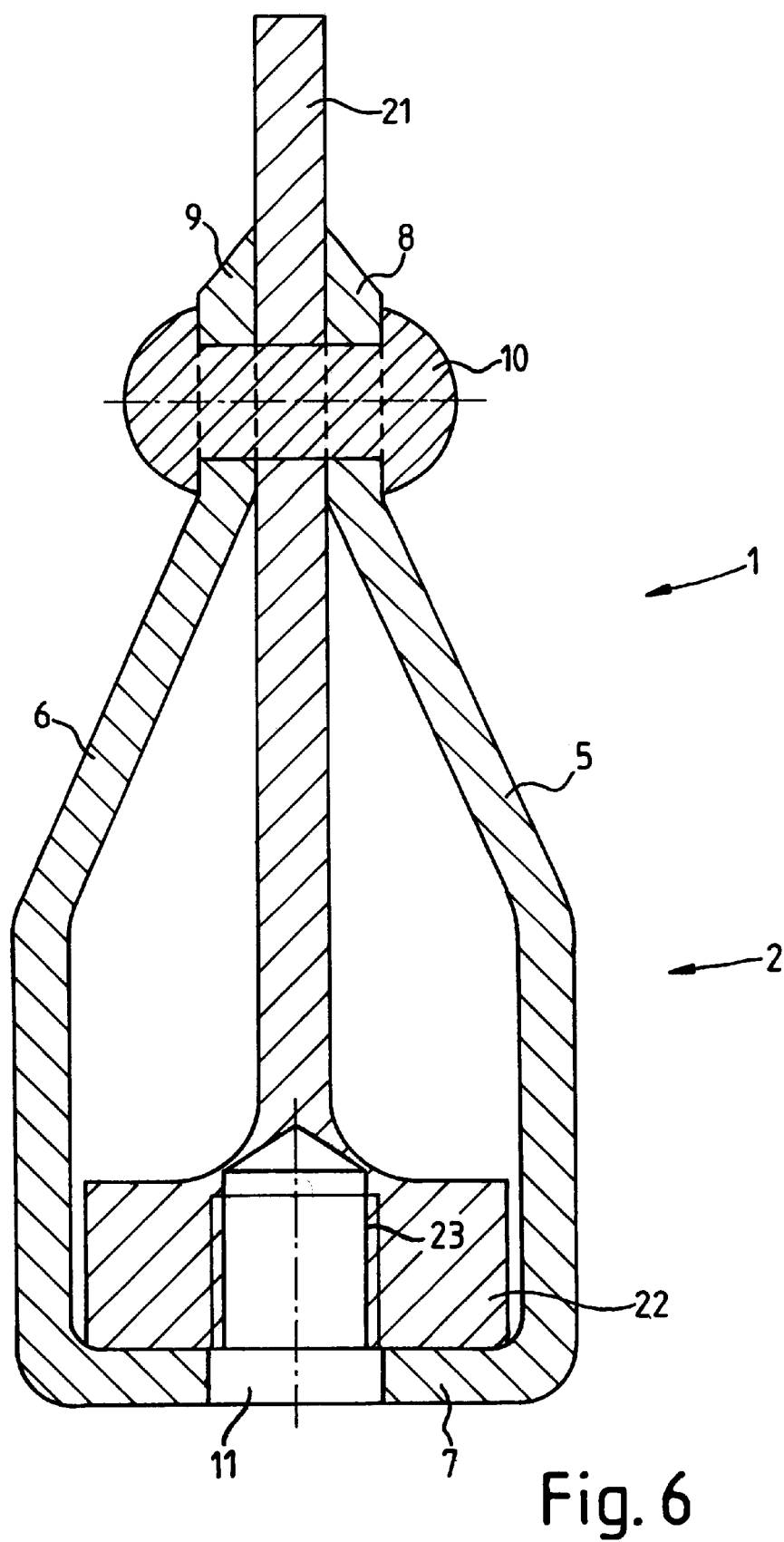
FIG. 6 shows a fourth exemplary embodiment of a crawler web according to the invention in cross-sectional view, with a continuous cutting edge and with holding means in the foot region of the cutting edge, and FIGS. 7a + b show a front view and a side view, respectively, of the cutting edge belonging to the exemplary embodiment according to FIG. 6.
Figure 7A:
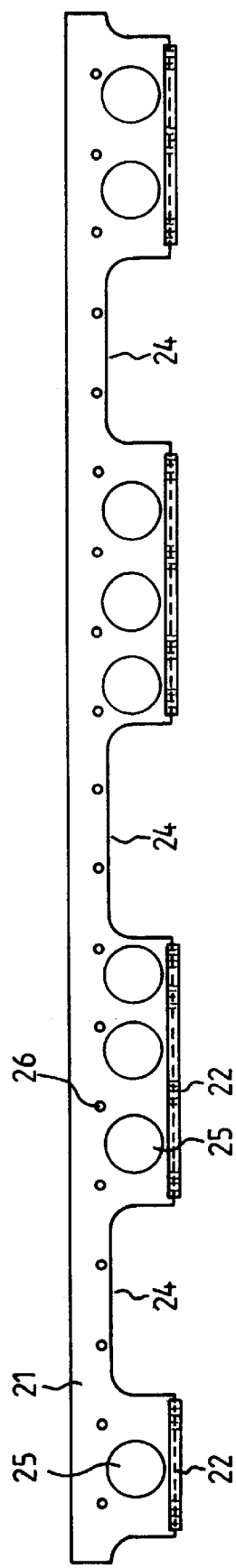
Figure 7B:
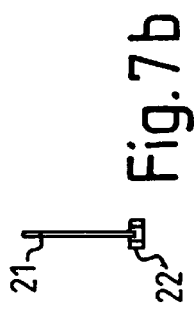

A further exemplary embodiment is shown in FIG. 6. In this embodiment too, a cutting edge 21 runs continuously as far as the connecting web 7. The fastening of the cutting edge 21 is designed, in the same way as in the exemplary embodiment according to FIG. 1, in the form of a rivet connection 10. The same basic body 2 as in the first exemplary embodiment may likewise be used. In contrast to the embodiment according to FIG. 4, however, the cutting edge 21 does not terminate in a groove, but rather merges into a foot part 22 which rests on the connecting web 7. Threaded bores 23 may be provided in the foot part 22, by means of which bores the cutting edge 21, together with the entire crawler web, can be fastened. For this purpose, bores or recesses 11 are provided in the connecting web 7 of the basic body 2, said bores or recesses making it possible to introduce, for example, a screw thread (not shown) into the threaded bore 23. A cutting edge 21 is illustrated in the front view and side view in FIGS. 7a and b. As in the embodiment according to FIG. 5, in this case too there are cutouts 24 which result in a reduction in weight. In addition, further recesses 25, which are circular in the present case, are provided in the cutting edge 21. This too allows a reduction in weight, whilst ensuring that the cutting edge has sufficient strength. Furthermore, bores 26 for the rivet connection 10 can be seen in FIG. 7a.

Depending on the material used, the basic body may be produced as an extruded profile (preferably in the case of aluminum) by means of a rolling method or via a bending operation (preferably in the case of steel). In a particularly lightweight design, the basic body 2 consists of plastic, preferably of fiber-reinforced synthetic resin. After the basic body has been produced, it is not necessary for the portions 8, 9, which are parallel in the fitted state, to be in this form already, since the position of the side legs 5, 6 can be changed, if appropriate, even in the elastic range. By virtue of the inventive design of the basic body, therefore, it is easily possible to use different thicknesses for the cutting edges 3, 18, 21 without the basic body having to be changed at the same time. This is because, if the portions 8, 9, in the case of a changed cutting edge thickness, do not have the desired parallelism prior to the fastening of the cutting edge, the flexibility of the side legs and, likewise, of the associated portions 8, 9 means that the connection of the cutting edge and basic body (by means of riveting, Tox clinching, screwing, welding, etc.) makes it possible to compensate for any orientation defect without any disadvantage as regards the stability of the crawler web.

Thus, by means of the crawler web according to the invention, tremendous flexibility with regard to the choice of material and adaptation to different applications can be achieved.

What is claimed is:

1. A crawler web for use in a crawler belt on a crawler vehicle having at least two mutually parallel bands oriented in the direction of travel of the vehicle, the crawler web oriented transversely to the direction of travel and comprising:
    a cutting member having a cutting edge; and
    an elongated body member defining a cross sectional shape having:
        a first side leg having a first portion;
        a second side leg having a second portion oriented relative to said first portion such that at least one side leg approaches the other; and
    a connecting web that connects said first side leg to said second side leg,
    wherein, after the at least one side leg approaches the other, said side legs merge into a first and second side leg portion, respectively, in which each respective portion runs at a distance from the other portion and said cutting edge is insertable between the legs.

2. A crawler web according to claim 1, wherein, after the at least one side leg approaches the other, each respective side leg portion runs essentially parallel to the other portion.

3. A crawler web according to claim 1, wherein the connecting web serves to support the bands of the crawler belt.

4. A crawler web according to claim 2, wherein the respective side leg portions are oriented perpendicularly to the connecting web.

5. A crawler web according to claim 2, wherein the two side legs merge into said respective side leg portions through at least one bend.

6. A crawler web according to claim 2, wherein the respective side legs are arranged in a U-shaped manner, and said first side leg is guided through a first bend in said first side leg portion and merges with said second side leg through a second bend in said second side leg portion.

7. A crawler web according to claim 1, wherein said cutting edge is inserted fixedly between said first and second portions by at least one of riveting, welding, and screwing.

8. A crawler web according to claim 1, wherein the cutting edge runs continuously through the elongate body member, from said respective side leg portions to said connecting web.

9. A crawler web according to claim 8, wherein the cutting edge is fastened to the connecting web through a screw connection arranged in a region of said connecting web and in a prepared portion of said cutting edge.

10. A crawler web according to claim 1, wherein a connector for fastening the crawler web to the bands of the crawler belt is provided in a region of the connecting web.

11. A crawler web according to claim 10, wherein the connector comprises threaded bores in the connecting web.

12. A crawler web according to claim 10, wherein said cutting edge is fastened to the connecting web by a fastener and said fastener for the connecting web also serves as the connector for the crawler web.

13. A crawler web according to claim 8, wherein said cutting edge is fastened through retention by the connecting web.

14. A crawler web according to claim 13, wherein said cutting edge is fastened through a longitudinal groove in the connecting web the cutting edge being at least partially guided in said longitudinal groove.

15. A crawler web according to claim 10, wherein the connector comprises a threaded strip inserted into the elongated body with corresponding orifices adaptable for introduction of a screw thread in the connecting web.

* * * * *